Figure 1:
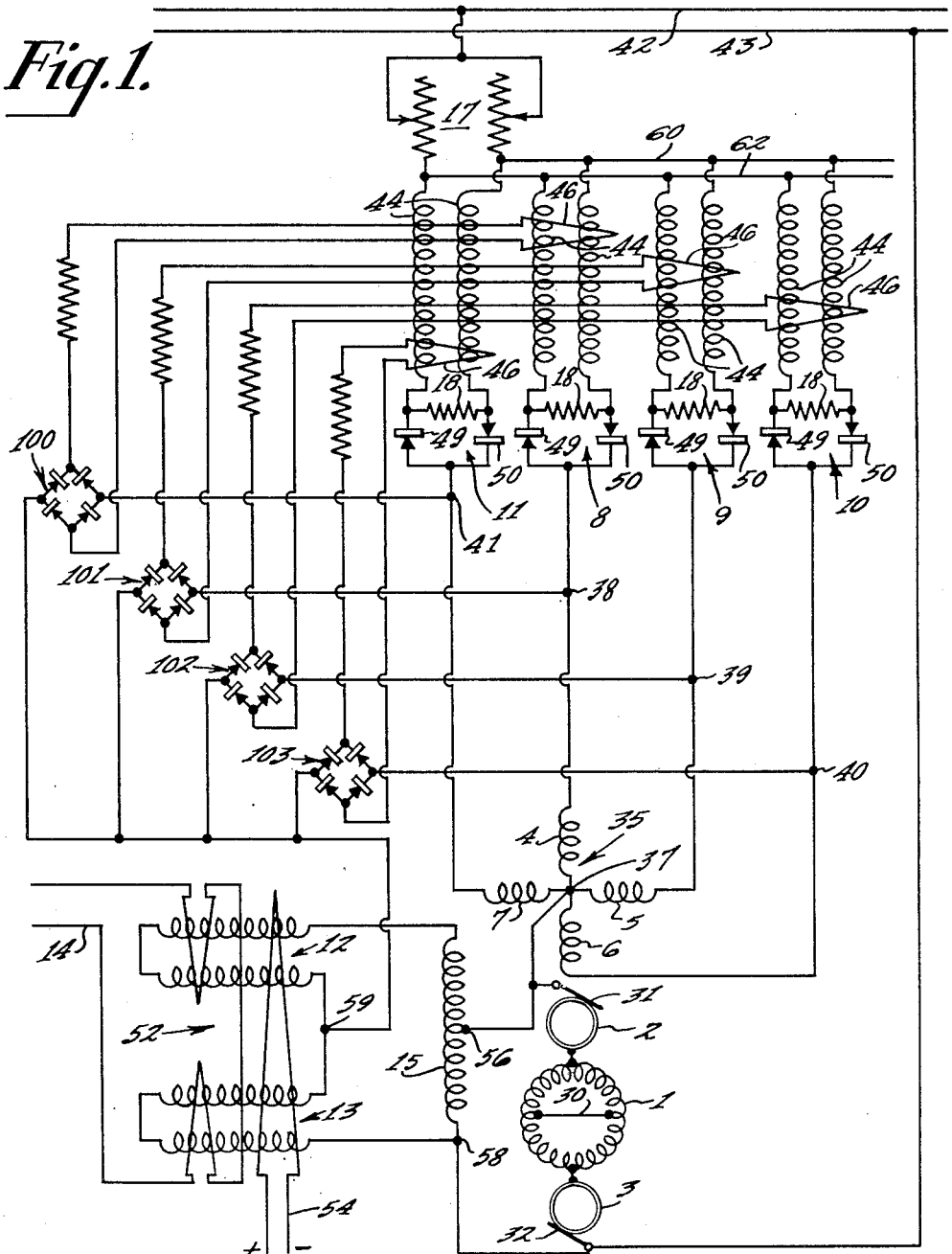

United States Patent Office 2,711,502
Patented June 21, 1955

2,711,502
ALTERNATING-CURRENT MOTOR

Ernst F. W. Alexanderson, Schenectady, N. Y.

Application July 21, 1954, Serial No. 444,865

15 Claims. (Cl. 318—194)

This invention relates to alternating-current motors having the operating characteristics of single-phase series or repulsion motors, and more particularly to alternating-current motors having single-phase series or repulsion motor operating characteristics which operate without mechanical commutation.

The speed of alternating-current single-phase series motors or repulsion motors may be easily controlled by varying the applied voltage. The ordinary series or repulsion motor has a mechanical commutator and brushes. The main current must be carried through these relatively moving components. Serious sparking and pitting result from voltages induced between commutator segments. These motors are ordinarily reversed by shifting the brush positions or reversing the field windings. Reversing these motors from a remote point electrically has, therefore, been found to be difficult. Induction motors controlled by electrical means such as magnetic amplifiers or vacuum-tube circuits have been, therefore, frequently used in remote-control and reversible service. Induction motors, however, are relatively inefficient in variable service speed.

This invention provides an alternating-current motor which provides a reversible high torque from standstill and through a wide range of operating speeds. A smooth reversible control system responsive to a remote electrical signal is also provided for this motor.

In accordance with this invention an alternating-current motor is constructed of a polyphase stator winding and a rotor winding with a short-circuit axis. An amplifier is connected to admit current to each of the stator phase windings. A means is provided for controlling the current flow through these amplifiers. As the rotor is rotated by current flow through any one of the stator phase windings and its associated amplifier, it reactively generates a voltage in the stator phase windings. The control means cuts off the current flow from this amplifier and associated phase winding and initiates current flow through another amplifier and its associated phase winding when this reactive voltage builds up to a predetermined value. The sequence of current flow through the various phases is arranged to provide rotation of the rotor in a preselected direction. This direction of rotation is controlled by comparing this reactive voltage with a reference voltage of variable polarity.

An object of this invention is to provide an efficient variable-speed alternating-current motor.

Another object is to provide highly sensitive electrical control system for a motor of the aforementioned type.

A further object is to provide an alternating-current motor having the operating characteristics of a single-phase series motor or alternating-current repulsion motor which does not require mechanical commutation.

Still a further object is to provide a reversible alternating-current motor which provides relatively high torque at standstill and through a range of operating speeds.

A still further object is to provide a sensitive electrical control system for an alternating-current motor having the aforementioned torque characteristics.

Figure 2:
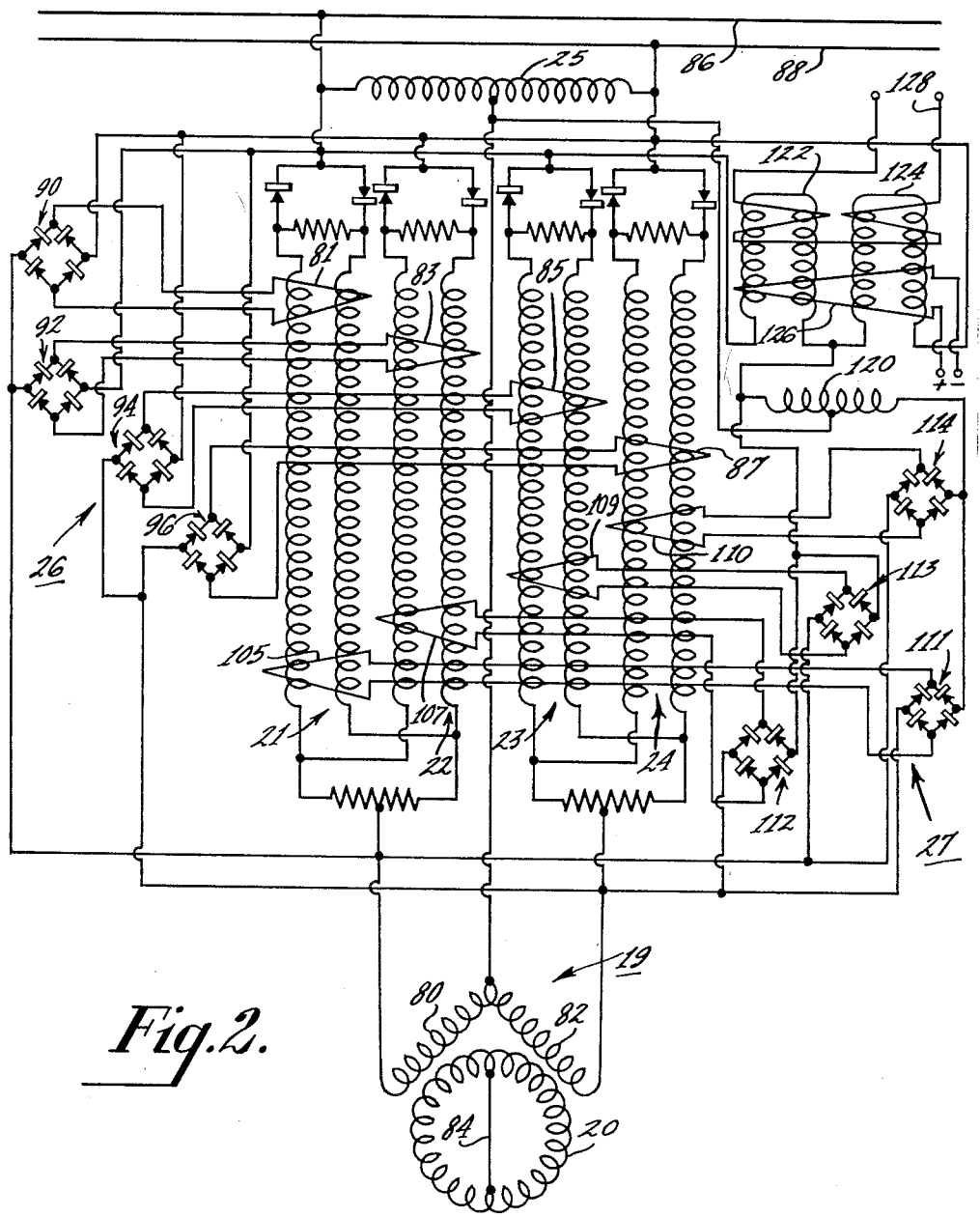

Other objects and advantages of the present invention will become apparent to one skilled in the art from a reading of the following specification in conjunction with the accompanying drawings of illustrative examples constructed according to the teachings of the present invention in which:

Fig. 1 is a schematic diagram of an alternating-current motor and control system which is an illustrative embodiment of the present invention, and Fig. 2 is a schematic diagram of a second alternating-current motor and control system which is another illustrative embodiment of the present invention.

In Fig. 1 is shown an alternating-current motor having a wound rotor 1 connected in series with the phases of a polyphase stator which may be a four phase stator 35 having the four phases 4, 5, 6 and 7 connected together at a neutral point 37. The wound rotor 1 has a short-circuit axis 30. Collector rings 2 and 3 are connected to oposite points on the rotor winding to form an excitation axis 90° displaced from the short-circuit axis. Brushes 31 and 32 deliver the series excitation to the collector rings. The rotor is thus connected in an analogous manner to the stationary field windings of the ordinary A.-C. series motor.

The stator 35 has 4 phase windings 4, 5, 6 and 7 connected at a neutral point 37. The neutral point 37 is connected in series with the excitation axis of the rotor through the collector rings. The phase windings 4, 5, 6 and 7 are each connected respectively to an amplifier 8, 9, 10 and 11. These amplifiers, for example, may be magnetic amplifiers. Magnetic amplifiers are particularly well adapted for carrying the high phase currents which flow through an alternating-current armature. The stator may be compared to be an armature as it functions in a similar manner to the rotating armature of the ordinary alternating-current series motor. The amplifiers are connected in common through an adjustable resistor 17 to line 42 which is one of two lines 42 and 43 which carry the single-phase alternating-current supply.

Each of the magnetic amplifiers 8, 9, 10 and 11 has two alternating-current load windings 44. A direct-current control winding 46 is also provided for each of these amplifiers. To simplify the diagrams, the cores of the magnetic amplifier are not shown and the direct-current control windings are represented by a single turn.

A means is provided for measuring the reactive voltage in each of the stator phase windings. This measuring means also provides a means for comparing the reactive voltage generated in the phase windings with a reference voltage. Rectifier bridges 100, 101, 102 and 103 are provided. These rectifier bridges are of the full-wave type and are used to convert alternating to direct current. They may be of the copper oxide or the selenium type. The bridges provide two sets of terminals. The stator phase-winding reactive voltage and the reference voltage are connected across one set of terminals while a direct current for energizing an amplifier control winding is connected across the other set of terminals.

The reference voltage is provided by a control circuit 52 which is later described. A common connection is made from the reference voltage terminals of each of the rectifiers to this reference voltage source. The reactive voltage is tapped from each of the stator phase windings at a point between the magnetic amplifier and the phase windings which it supplies. For example, point 38 is provided in the line to stator phase winding 4. Point 39 is provided in the line to phase winding 5, point 40 is provided in the line to phase winding 6 and point 41 is provided in the line to phase winding 7.

The control winding terminals of each of the rectifier bridges provides direct current to the control winding of an amplifier supplying another phase winding with current. For example, the rectifier 101 whose alternating current terminals measure the reactive voltage in phase 4 has its direct current side connected to the control winding of amplifier 9 which controls current flow to phase winding 5. Rectifier 102 whose alternating current terminals are connected to phase winding 5 is connected to supply direct current to the control winding of amplifier 10 which controls current flow to phase winding 6. Rectifier 103 connected to phase winding 6 is connected to supply direct current to the control winding of amplifier 11, supplying phase winding 7. Rectifier 100, whose alternating current terminals are connected to phase winding 7, is connected to supply direct current to the control winding of amplifier 8, controlling current flow to phase winding 4. Each of the rectifier bridges, therefore, is connected to compare the alternating reactive voltage generated in a phase winding with the reference voltage to supply a direct current signal to the control winding of an amplifier supplying current to another phase winding.

Each of the magnetic amplifiers has a resistor 18 connected across its load coils to provide a bypass for introducing negative feedback responsive to current. A rectifier 49 or 50 is connected to each load winding of the amplifiers to govern the direction of current flow therethrough to provide full-wave operation.

A control circuit 52 is provided. It is made up of a pair of amplifiers 12 and 13. These amplifiers, for example, may be the simple series-connected saturable-reactor type. Self-saturating reactors may also be used. A control winding 14 is connected to carry a variable polarity direct current to control the reference voltage and the direction of rotation of the motor. A bias winding 54 is provided for the saturable reactors 12 and 13. An autotransformer 15 is connected across the saturable reactors. The mid-terminal 56 of the autotransformer is connected to the supply line 42 through the neutral point 37 of the stator. An end point 58 of the transformer is connected to the other supply line 43. A tap 59 is provided between the saturable reactors 12 and 13 to provide a connection for providing the alternating-current reference voltage to the rectifiers 100 and 103.

This motor may be compared to a conventional alternating-current series motor in which the functions of the stator and the rotor are reversed. This present motor has a stationary armature and a rotating field. It is, therefore, analogous to a series motor in which the commutator segments are stationary and the brushes revolve. The magnetic amplifier system introduces the alternating current into successive stator phase windings so that the magnetic field created by the flow of current through successive stator windings revolves at a uniform rate with respect to the rotor. The short-circuit axis of the rotor rotates with the magnetic field and carries an induced current corresponding to the induced compensating current in a conventional series motor. The series excitation is supplied to the rotor through collector rings.

The alternating current is introduced successively into the phase windings by the magnetic amplifiers 8, 9, 10 and 11. These amplifiers are controlled to cause a magnetizing current to flow through the phase windings of the stator in accordance with the position of the short-circuit axis of the rotor. As the rotor revolves under the influence of the rotating magnetic field, a reactive voltage appears by transformer action in each of the stator phase windings. This reactive voltage is compared with the reference voltage across the rectifier bridges 100 to 103. A control current is developed across the direct-current terminals of the rectifiers. This direct current controls the current flow through amplifiers supplying current to the stator phase windings. Current is thereby caused to flow through successive phase windings in response to the reactive voltages developed therein to provide a revolving magnetic field. This control system, therefore, functions analogously to a mechanical commutator. Each phase winding as it carries the current flow develops a signal to cut off its own current flow and to initiate current flow through the succeeding phase winding.

As shown in Fig. 1, when the short-circuit axis 30 of the rotor is in phase with stator winding 5; a reactive voltage has been built up or developed in the phase which has been carrying current. This reactive voltage in combination with the reference voltage provided by the control circuit 52 develops a direct current across rectifier bridge 101. This direct current flows through the control winding 46 associated with magnetic amplifier 9. This current reduces the impedance through this amplifier and causes it to conduct the current flow. As the rotor turns, the reactive voltage developed in phase 5 turns amplifier 10 on at the proper time to pass current through phase 6. In the same manner, the voltage developed in phase 6 starts the current flowing through phase 7, and the voltage developed in phase 7 completes the cycle by controlling the current flow through phase 4. Current flows only in one or two phase windings at one time. This current flows in response to the reactive voltages developed.

With the rotor in the illustrative position in phase with winding 5, the reactive voltages in phase windings 4, 5, 6 and 7 are respectively full positive, zero, zero and full negative. Amplifier 9 is, therefore, fully activated by the positive signal and the three other amplifiers are deactivated by the zero and negative signals. Practically no current is, therefore, admitted by the deactivated amplifiers to their respective windings. Current, therefore, flows only in phase 5 and reacts against the field excited by the rotor winding to produce a torque in the clockwise direction. The reference voltage provides the bias to maintain three of the amplifiers cut off while current is admitted through the activated phase winding.

Assuming that the rotor has moved 45°, the voltage introduced in phase 4 decreases and the voltage in phase 5 increases so that they are equal. Amplifiers 9 and 10 are then activated to pass equal currents. The wave of magnetizing ampere turns has, therefore moved forward 45° to a point mid-way between phase 5 and 6. The rotating magnetic field, therefore, progresses in a fixed relationship to the rotor to produce a continuous torque.

The reference voltage may be varied to reverse the direction of rotation of the motor. To reverse the direction of rotation of the rotating magnetic field, a negative signal is introduced in the direct-current control winding 14. The reference voltage of the control circuit or demodulator 52 is, therefore, reversed. This reversal of potential of the reference or bias voltage reverses the current flow through the phase windings for the illustrated position of the rotor. Amplifier 11 supplying phase winding 7 is activated by the comparison of the reactive voltage introduced in phase winding 4 and the reference voltage introduced in the demodulator or rectifier bridge, instead of amplifier 9 being activated as in the previous case. Current is admitted to phase winding 7 after it is admitted to phase winding 4 instead of being admitted to phase winding 5 as described previously. The magnetic field is, therefore, caused to rotate in a counter-clockwise direction to provide a reversible torque in the opposite direction. A smooth reversal of direction of rotation of the rotor is thereby provided in response to a remote electrical signal.

The self-saturating circuit in the supply magnetic amplifiers provides high sensitivity, but may also slow down the response to the control signals. As the reactive voltages appear in the phase windings by transformer action from the rotor, the rectified feedback tends to short circuit the control. The induced short circuit occurs when the control acts to reduce the direct current flux. This reduction in flux induces a voltage which tends to cause a current to flow which opposes the control signal or current. A resistor in the rectified feedback circuit is only a partial remedy for this opposing current. Some amount of the undesired current must flow in order to make this resistance effective to produce a neutralizing potential.

This difficulty is overcome in the following manner. The amplifiers 8, 9, 10 and 11 are combined in a common circuit with load coils 44 across lines 60 and 62. Lines 60 and 62 are connected together through variable resistor 17. In operation the current shifts from one amplifier to another. Two amplifiers carry current while the other two are idle. In the amplifiers carrying the current, the direct current flux is increasing while in the idle amplifiers the flux is decreasing. The sum of the rectified feedbacks through the common connection is, therefore, constant even though the rectified current in the individual amplifiers fluctuates between zero and the maximum.

The combined rectified current causes a voltage drop in resistor 17. A voltage is thus created by the current flowing in the active amplifiers. This current is introduced into the circuits of the idle amplifiers to oppose the D.-C. voltage introduced by the decreasing D.-C. flux. A flow of current which might oppose the control current to make the response sluggish is, therefore, prevented. The resistor 17 is adjusted to provide a potential which allows high speed response to a control signal. This provides a correspondingly high motor speed. The variable resistor 17 also provides a means for controlling the motor speed. It, therefore, functions analogously to a means for varying the potential supplied to a series-connected A.-C. motor. This resistor in itself may be the only means necessary for controlling the motor speed.

Another way to provide high speed response is to introduce negative feedback responsive to current flow. This feedback is overpowered by using a relatively high control current. A means for introducing this negative feedback is illustrated by resistors 18 across the load windings of each amplifier. These resistors bypass a portion of the positive feedback and give the effect of full-voltage compensation.

Although this motor has been illustrated as a four-phase motor having four amplifiers supplying current to the phase windings, motors having other numbers of phase windings may also be constructed on the same principles. For example, a three-phase stator winding supplied by three amplifiers may also be constructed in accordance with the teachings of this invention.

In Fig. 2 is shown a schematic diagram of a motor which has a conventional quarter-phase stator winding 19 made up of phase windings 80 and 82. The rotor winding 20 has a short-circuit axis 84. There are no connections through collector rings or any other similar devices to the rotor winding. In this aspect he motor differs from both the alternating-current series motor and repulsion motor.

Each phase 80 and 82 of the stator winding 19 is fed from a pair of amplifiers connected toward the middle point of autotransformer 25 to work in push-pull relationship. The autotransformer 25 is connected to the power supply across single-phase potential lines 86 and 88.

The amplifiers may be magnetic amplifiers of the type described in Fig. 1. Magnetic amplifiers 21 and 22 working in push-pull towards the middle point of autotransformer 25 are connected to feed stator phase-winding 80. Magnetic amplifiers 23 and 24 working in the opposite direction in push-pull toward the middle point of autotransformer 25 are connected to feed stator phase-winding 82. Each of the pairs of amplifiers, connected together in push-pull for full-wave operation, is similar to the individual magnetic amplifiers 8, 9, 10 and 11 shown in Fig. 1. They are connected here in push-pull relationship for full-wave operation. Rectifier bridges 90, 92, 94 and 96, similar to those shown in Fig. 1, are provided. The A.-C. terminals of these bridges are connected to compare the reactive voltage developed in the stator phase windings with the voltage across the A.-C. power source. The reactive voltage taps or connections are made between the magnetic amplifier and the phase winding that it supplies. Direct-current lines are connected across opposite sides of these rectifier bridges. These direct-current lines are connected to D.-C. control windings in the magnetic amplifier supplying current. Rectifier bridge 90 for example, which measures the voltage in phase 80 has a direct current connection to the control winding 81 for amplifier 21 which supplies phase 80. Rectifier bridge 92, for example, measures the reactive voltage in phase 80 and has a connection for the direct current control winding 83 of magnetic amplifier 22 which also supplies phase 80. Rectifier bridge 94, which measures the reactive voltage in phase 82 provides a connection for direct-current winding 85 controlling magnetic amplifier 23 supplying phase 82. Rectifier bridge 96 is connected to measure the reactive voltage in stator phase winding 82 and provides a point of connection for the direct-current control winding 87 for magnetic amplifier 24 which supplies phase 82. These connections may be considered positive feedback connections as will be later explained. They provide a means for feeding back a signal in response to the reactive voltage induced by the transformer action between stator and rotor.

Another set of D.-C. control windings is provided for the magnetic amplifiers. Control winding 105 is provided for magnetic amplifier 21, 107 for magnetic amplifier 22, 109 for magnetic amplifier 23 and 110 for magnetic amplifier 24. These control windings are supplied from rectifier bridges 111, 112, 113 and 114 respectively. These rectifier bridges have one of their A.-C. terminals connected to the opposite phase from the phase supplied by their associated control winding and amplifier. The other A.-C. terminal is connected to an autotransformer 120 which provides a reference or bias voltage. These rectifier bridges are, therefore, connected between the magnetic amplifier feeding the opposite phase winding and the autotransformer 120. This autotransformer is connected to a pair of small magnetic amplifiers 122 and 124. These magnetic amplifiers are controlled by a bias or reference winding 126 and a master-control winding 128. The pair of magnetic amplifiers 122 and 124 are connected across the power supply autotransformer 25. Rectifier bridges 111 to 114 may be considered to comprise a demodulator group which is controlled by the working current.

The ampere turns of working current in the stator are always opposite to the short-circuit axis of the rotor. A current is thereby induced in the rotor winding by transformer action. This induced rotor current reacts against the field flux produced by the magnetizing ampere turns on the stator and produces a torque. The signal for magnetizing current is a positive feedback from the voltage induced by the alternating field flux. This field develops only at right angles to the short-circuit axis. The magnetizing signal, therefore, depends upon the position of the rotor and develops magnetizing ampere turns along the correct axis to produce rotation of the rotor. The demodulator group 26 comprising rectifier bridges 90, 92, 94 and 96 provides a means for feeding back this magnetizing signal to the magnetic amplifier which is supplying current at a particular instant. The D.-C. control signal fed back to the amplifier is a measure of the vectorial sum of the phase voltage of the phase which is being fed with current and a reference voltage which is the power voltage. The control signal is, therefore, a measure of the power voltage as compared to the voltage in the phase winding as affected by the reactive component of the field induced by transformation.

Demodulator group 27 is comprised of the rectifier bridges 111 to 114. It develops a signal which is a measure of the vectorial sum of the phase voltage of the opposite phase to the phase drawing current and a reference voltage. The reference voltage in this case is provided through small magnetic amplifiers 122 and 124 controlled by the master control coil 128. This reference voltage is reversed by reversing the polarity of the direct-current across this master control coil. The working current can, therefore, be reversed with respect to the magnetizing current. This provides a means for reversing the direction of rotation of the motor. The reference voltage is reversed in the same manner as explained in connection with Fig. 1.

These magnetic amplifiers and control circuits provide a means for changing the phase relationship between stator and rotor to provide rotation of the motor to produce a torque. The usual collector rings or similar electrical connections to the rotor winding found in ordinary series or repulsion motors which provide this phase opposing function are eliminated.

The convenient reversal by means of the master control makes this motor especially adapted for position-control motors and servomechanisms. It may be desirable in some cases to modify the phase of the reference voltage by other well known means which are not herein illustrated.

Both of these embodiments of this invention are illustrative examples of A.-C. motors which have operating characteristics similar to those of series or repulsion motors without making use of a mechanical commutator.

What is claimed is:

1. An alternating-current motor comprising a polyphase stator winding, a rotor winding with a short-circuit axis, magnetic amplifiers connected to the stator phase windings for admitting single-phase currents to said phase windings in succession, means for providing a reference voltage, means for combining the voltage appearing across each phase winding with said reference voltage, means for rectifying the vectorial sums of said combined voltages, and means connecting said rectifying means with said amplifier means for applying said rectified signals to control an amplifier connected to a phase winding other than the one from which said signal originated.

2. An alternating-current motor comprising a polyphase stator winding, a rotor winding with a short-circuit axis, magnetic amplifiers connected to the stator phase windings for admitting single-phase currents to said phase windings in succession, means for providing a reference voltage, means for combining the voltage appearing across each phase winding with said reference voltage, means for rectifying the vectorial sums of said combined voltages, means connecting said rectifying means with said amplifier means for applying said rectified signals to control an amplifier connected to a phase winding other than the one from which said signal originated, and means for reversing the polarity of the reference voltage to reverse the direction of rotation of said motor.

3. An alternating-current motor comprising a polyphase stator winding, a rotor winding with a short-circuit axis, magnetic amplifiers connected to the stator phase windings for admitting single-phase currents to said phase windings in succession, means for providing a reference voltage, means for combining the voltage appearing across each phase winding with said reference voltage, means for rectifying the vectorial sums of said combined voltages, means connecting said rectifying means with said amplifier means for applying said rectified signals to control an amplifier connected to a phase winding other than the one from which said signal originated, and means for controlling the phase and amplitude of the rectified voltage signal to regulate the motor torque in the forward and reverse directions of rotation.

4. An alternating-current motor comprising a polyphase stator winding, a rotor winding with a short-circuit axis, magnetic amplifiers connected to the stator phase windings for admitting single-phase currents to said phase windings in succession, means for providing a reference voltage, means for combining the voltage appearing across each phase winding with said reference voltage, means for rectifying the vectorial sums of said combined voltages, means connecting said rectifying means with said amplifier means for applying said rectified signals to control an amplifier connected to a phase winding other than the one from which said signal originated, means for applying said rectified signals to make preselected amplifiers active and other preselected amplifiers idle, said amplifiers being connected in a common circuit, a resistor in said common circuit, said circuit providing means for creating a voltage in response to the sum of the currents in the active amplifiers, and means for introducing said voltage into the circuits of said idle amplifiers.

5. An alternating-current motor comprising a polyphase stator winding, a rotor winding with a short-circuit axis, collector-rings connected to an excitation axis of the rotor winding in quadrature to said short-circuit axis, means for placing the collector-ring circuit of said rotor in series with the sum of the currents in said stator phase windings, magnetic amplifier means connected to said stator phase windings for admitting single-phase current to said phase windings in succession, means for providing a reference voltage, means for combining the voltage appearing across each phase winding with said reference voltage, means for rectifying the vectorial sums of the combined voltages, and means for connecting said rectifier means with said amplifier means for applying each rectified signal to the control of an amplifier feeding a phase winding other than the one from which the signal originated.

6. An alternating current motor comprising a polyphase stator winding, a rotor winding with a short-circuit axis, collector-rings connected to an excitation axis of the motor winding in quadrature to the short-circuit axis, means for placing said rotor in series with the sum of the currents in said stator winding, magnetic amplifier means connected to said stator phase windings for admitting single-phase current to said phase windings in succession, means for providing a reference voltage of variable phase, means for combining the voltage appearing across each phase winding with said variable reference voltage, means for rectifying the vectorial sums of the combined voltages, and means for connecting said rectifier means with said amplifier means for applying each rectified signal to control an amplifier feeding a phase winding other than the one from which the signal originated.

7. An alternating-current motor comprising a polyphase stator winding, a rotor winding, means connected to said stator winding for selectively admitting current to its phase windings, means connected between said stator winding and said current-admitting means for providing a signal to said current-admitting means in response to the reactive-voltage induced in said stator phase windings, and said current-admitting means including control means for selectively admitting current to said phase windings in a predetermined sequence in response to said signals.

8. The invention comprising the combination set forth in claim 7 wherein separate signal-providing means are connected in a predetermined arrangement between each of said phase windings and each of said current-admitting means, each of said signal-providing means being connected to control the current flow to a phase winding other than the phase winding to which it is connected.

9. An alternating-current motor comprising a polyphase stator winding, a rotor winding, magnetic amplifier means having control windings connected to each of the stator phase windings for selectively admitting current thereto in sequence to produce rotation of said rotor, and rectifier means connected between said phase windings and said control windings for providing a D.-C. signal for activating said amplifiers to admit current in said sequence in response to the A.-C. reactive voltage produced in said stator phase windings.

10. An alternating-current motor comprising a polyphase stator winding, a rotor winding, means for admitting current connected to each of said stator phase windings, said current-admitting means including a means for controlling the flow of current therethrough, means for producing a signal in response to the reactive voltage produced in a stator phase winding by transformation, means for providing a reference voltage, and a means for comparing said reactive voltage signal with said reference voltage, said comparing means being connected to said control means to provide a resultant signal in response to said reactive and reference voltages, said control means admitting current through each of said current-admitting means in response to said resultant signal in sequence to produce rotation of said rotor.

11. The invention comprising the combination set forth in claim 4 wherein said means providing said reference voltage includes means for reversing the polarity of said reference voltage, said comparing means including means for providing a resultant signal of reversed polarity to said control means, and said control means including means for admitting current through said current admitting means in a reversed sequence to produce reversed rotation of said rotor.

12. An alternating-current motor comprising a polyphase stator winding, a rotor winding, magnetic amplifier means connected to each of said stator phase windings for selectively admitting current thereto, each of said magnetic amplifier means including a control means, means for producing a signal in response to the reactive voltage produced in said phase winding carrying current at a predetermined time, means for providing a reference voltage, rectifier means for comparing each of said reactive voltage signals with said reference voltage, said rectifier means being connected to each of said control means to provide a signal to cut off the current flow through said amplifier carrying current at said predetermined time and to initiate current flow through another amplifier in response to said signal, and means for arranging the sequence of current flow through said various phases to provide rotation of said rotor in a preselected direction.

13. An alternating-current motor comprising a polyphase stator winding, a rotor winding, magnetic amplifier means connected to each of said stator phase windings for selectively admitting current thereto, means for providing a reference voltage, means connected to a phase winding of said stator for producing a signal in response to the reactive voltage produced in a stator phase winding carrying current at a predetermined time, means for comparing said reactive voltage with said reference voltage, said comparing means being connected to said amplifier means carrying current to control the flow of current through said amplifier, means connected to another of said stator phase windings for providing a signal in response to the working current flowing through said phase winding, means providing a second reference voltage, means connected to said amplifier carrying current at said predetermined time for providing a second control signal to said amplifier, and means for combining said signals to produce a torque between said stator and said rotor.

14. The invention comprising the combination set forth in claim 13 wherein means are provided for reversing the polarity of said second voltage to reverse the polarity of the working current signal with respect to the reactive voltage signal, said polarity reversing means providing means for reversing the direction of rotation of said motor.

15. The invention comprising the combination set forth in claim 13 in combination with a source of power voltage, said power voltage comprising said first reference voltage.

No references cited.